L. Dederick,
Hay Press.
No. 2,315. Reissued July 17, 1866.
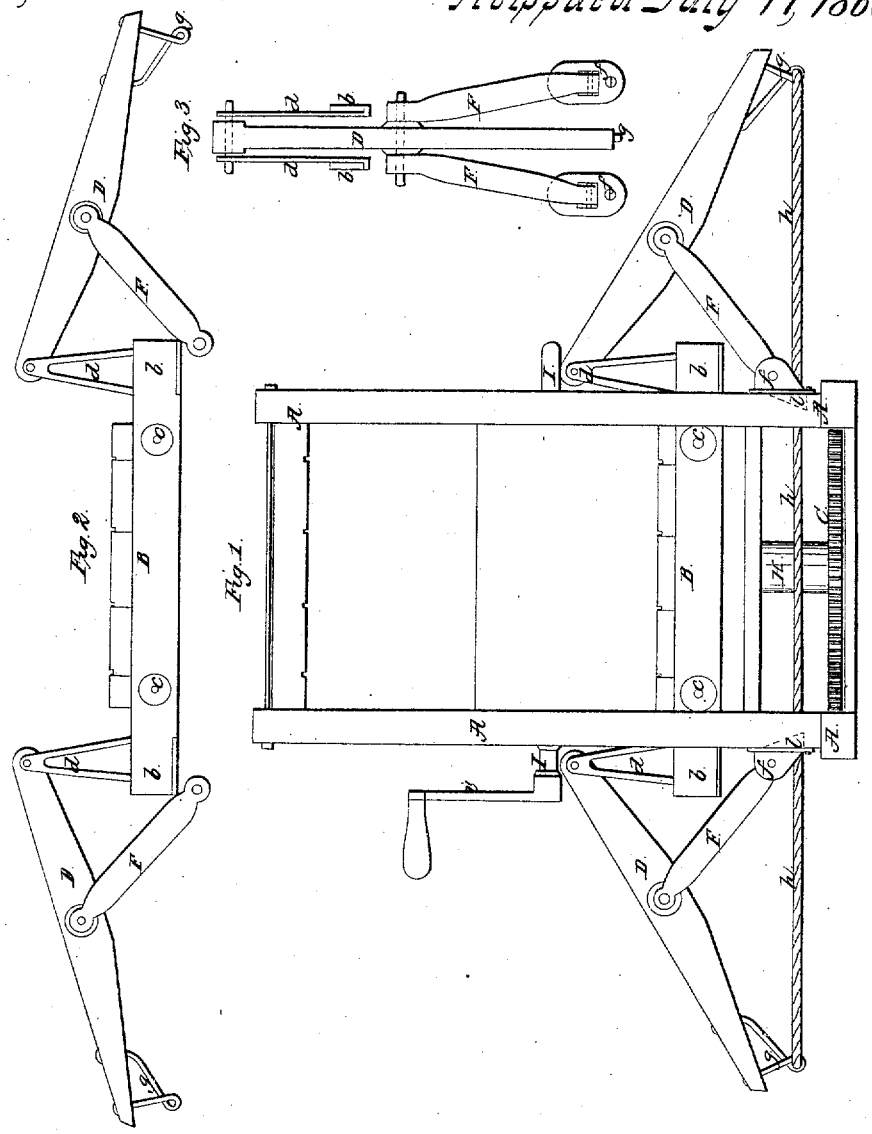
Witnesses:
E. Evans Jr.
A. Moore
Inventor:
Levi Dederick.
By his atty.
J. S. Brown.
AM. PHOTO-LITHO. CO. N.Y. (OSBORNE'S PROCESS)

UNITED STATES PATENT OFFICE.

LEVI DEDERICK, OF ALBANY, NEW YORK.

IMPROVEMENT IN HAY-PRESSES.

Specification forming part of Letters Patent No. 39,258, dated July 14, 1863; Reissue No. 2,315, dated July 17, 1866.

*To all whom it may concern:*

Be it known that I, LEVI DEDERICK, of the city and county of Albany, State of New York, have invented a new and Improved Press for Pressing Cloth, Cotton, Hay, &c.; and I do hereby declare the following description and accompanying drawings are sufficient to enable any person skilled in the art or science to which it most nearly appertains to make and use my said invention or improvements without further invention or experiment.

The nature of my invention and improvements consists in the use of toggle-levers placed at opposite sides of the press-box and connected to the ends of the follower outside of the press-box, so as to raise the follower and press a bale, in connection with the toggle-links having their fixed ends hinged at or near the bottom of the frame; and in the use of toggle-levers combined with a suspended follower; and in suspending the follower to the upper ends of the levers through perpendicular slots or openings in the sides of the press-box; also, in some rigid brackets to connect the ends of the follower-timbers which project through the sides of the press to the toggle-levers on the outside of the press-box.

In the accompanying drawings, Figure 1 is an elevation of my improved press with the follower down ready to receive a pressing of hay. Fig. 2 shows the toggle-levers and follower separate from the press. Fig. 3 is an edge view of the toggle-levers, links, and their connections.

My improved press is one of that class in which toggle-levers and links are used to raise the follower vertically and perform the pressing, the object being to render the press compact, so that it may be used in a room of ordinary height with convenience.

Prior to my invention when toggle-levers were used they were made to extend far above the press-frame, and were connected to the follower by long rods inside the press-box, and when so arranged the press required a room of great height, besides the presses were not close, compact, or convenient.

In the above-mentioned drawings, A A are sills connected by the bar C, into which sills the posts A′ A′ are fastened and connected by the bar C′ and top bar, $C^2$, making a strong frame, to which the other parts are fastened or connected. The follower B is made to traverse freely between the posts A′ A′, and is provided with rollers *c c* to roll against the post as it traverses up and down in the process of pressing and releasing a bale.

There are two long perpendicular slots in each end of the press, through which slots the narrow ends *b b* of the follower project, as shown in Fig. 1. To these narrow ends *b b* of the follower, which project beyond the posts, stirrups *d d* are fastened, to lift the follower by the toggle-levers D D, connected to the stirrups so as to vibrate freely and swing in between the ends *b b* of the follower when the bale is pressed.

The levers D D are made in the form shown in the drawings and hinged to the toggle-links F F, as shown in Figs. 1 and 2. The lower ends of these links are hinged in the brackets *f f*, fastened to the lower ends of the posts, and provided with lugs *z z*, which are fitted into the posts, as shown by dotted lines in Fig. 1, making a very strong connection. The eye-staples *g g* are fastened in the lower ends of the levers D D to receive the ends of the ropes *h h*, which are fastened in them and connect the ends of the levers to the windlass H under the center of the press, the journals of which windlass turn in the bars C and C′, and it is turned by the gear G. (Shown in Fig. 1.) There is a small frame in the rear of the press and connected to it to support the horizontal shaft I, which is turned by the crank *i*, carrying a bevel-gear, which drives a bevel-gear carrying an upright shaft and pinion to turn the gear G and windlass H to work the press.

As the ropes *h h* are wound on the windlass H they draw in the outer ends of the levers D D and links F F until the levers and links are parallel with the posts A′ A′, which operation pushes or forces the follower B up toward the top bar of the press and presses a bale, when it may be bound as required.

What I claim in the above-described press is—

1. The use of two toggle-levers placed at opposite sides of the press-box, in combination with links having their fixed ends located at or near the bottom of the frame, so that the upper ends of the levers will move upon the outside of the press-box in pressing a bale, 2. The use of toggle-levers, in combination with a suspended follower, when the upper ends of the former traverse along the side of the press-box.

3. Suspending the follower to the upper ends of the levers through the perpendicular slots or openings in the sides of the press-box.

4. The rigid bracket-connections, or their equivalents, in combination with the ends of the follower-timbers projecting through the slots in the sides of the press, in the manner and for the purpose substantially as described.

LEVI DEDERICK.

Witnesses:

WM. T. ROCKEFELLER,

P. K. DEDERICK.